(12) United States Patent
Hoffmann et al.

(10) Patent No.: US 7,483,473 B2
(45) Date of Patent: *Jan. 27, 2009

(54) ACCESS CHANNEL STRUCTURE FOR WIRELESS COMMUNICATION SYSTEM

(75) Inventors: John E. Hoffmann, Indialantic, FL (US); George Rodney Nelson, Jr., Merritt Island, FL (US); James A. Proctor, Jr., Indialantic, FL (US); Antoine J. Rouphael, Escondido, CA (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,202

(22) Filed: Apr. 11, 2005

(65) Prior Publication Data

US 2005/0175071 A1  Aug. 11, 2005

Related U.S. Application Data

(63) Continuation of application No. 09/766,875, filed on Jan. 19, 2001, now Pat. No. 6,904,079.

(60) Provisional application No. 60/181,071, filed on Feb. 8, 2000.

(51) Int. Cl.
*H04L 27/30* (2006.01)
(52) U.S. Cl. .................. 375/145; 375/149; 375/364; 370/491; 370/500; 370/510; 370/514
(58) Field of Classification Search ......... 375/141–143, 375/145, 147, 150, 152, 364, 366, 367, 368; 370/491, 500, 509, 510, 512, 514, 528
See application file for complete search history.

(56) References Cited

U.S. PATENT DOCUMENTS 6,304,624 B1  10/2001  Seki et al.

(Continued)

FOREIGN PATENT DOCUMENTS

EP  0 847 145  11/1997

(Continued)

OTHER PUBLICATIONS

Yang, "CDMA RF System Engineering," pp. 105-131 (1998).

*Primary Examiner*—Dac V Ha
(74) *Attorney, Agent, or Firm*—Volpe and Koenig, P.C.

(57) ABSTRACT

A technique for efficient implementation of pilot signals on a reverse link in a wireless communication system. An access channel is defined for the reverse link such that within each frame, or epoch, a portion is dedicated to sending only pilot symbols. Another portion of the frame is reserved for sending mostly data symbols; however, within this second portion of the frame, additional pilot symbols are interleaved among the data symbols. The pilot symbol or preamble portion of the access channel frame allows for efficient acquisition of the access signal at the base station, while providing a timing reference for determining the effects of multipath fading. In particular, a pilot correlation filter provides a phase estimate from the pilot symbols in the preamble portion, which is then used to decode the data symbols in the payload portion. An access acquisition portion of the receiver uses the phase estimates provided by the pilot correlation filter to process the output of a data symbol correlation filter. The additional pilot symbols embedded in the payload portion are used in a cross product operation to further resolve the effects of multipath fading.

14 Claims, 6 Drawing Sheets

U.S. PATENT DOCUMENTS

| | | |
|---|---|---|
| 6,381,229 B1 | 4/2002 | Narvinger et al. |
| 6,389,034 B1 | 5/2002 | Guo et al. |
| 6,519,296 B1 * | 2/2003 | Hladik ............... 375/325 |
| 6,594,248 B1 | 7/2003 | Karna et al. |
| 6,801,564 B2 | 10/2004 | Rouphael et al. |
| 6,904,079 B2 * | 6/2005 | Hoffmann et al. ........... 375/145 |
| 7,046,717 B2 * | 5/2006 | Kanterakis et al. .......... 375/141 |

FOREIGN PATENT DOCUMENTS

| | | |
|---|---|---|
| EP | 0 847 145 A2 | 11/1997 |
| WO | 99/60729 | 11/1999 |
| WO | WO 99/60729 | 11/1999 |
| WO | 99/67921 | 12/1999 |
| WO | WO 99/67921 | 12/1999 |

* cited by examiner

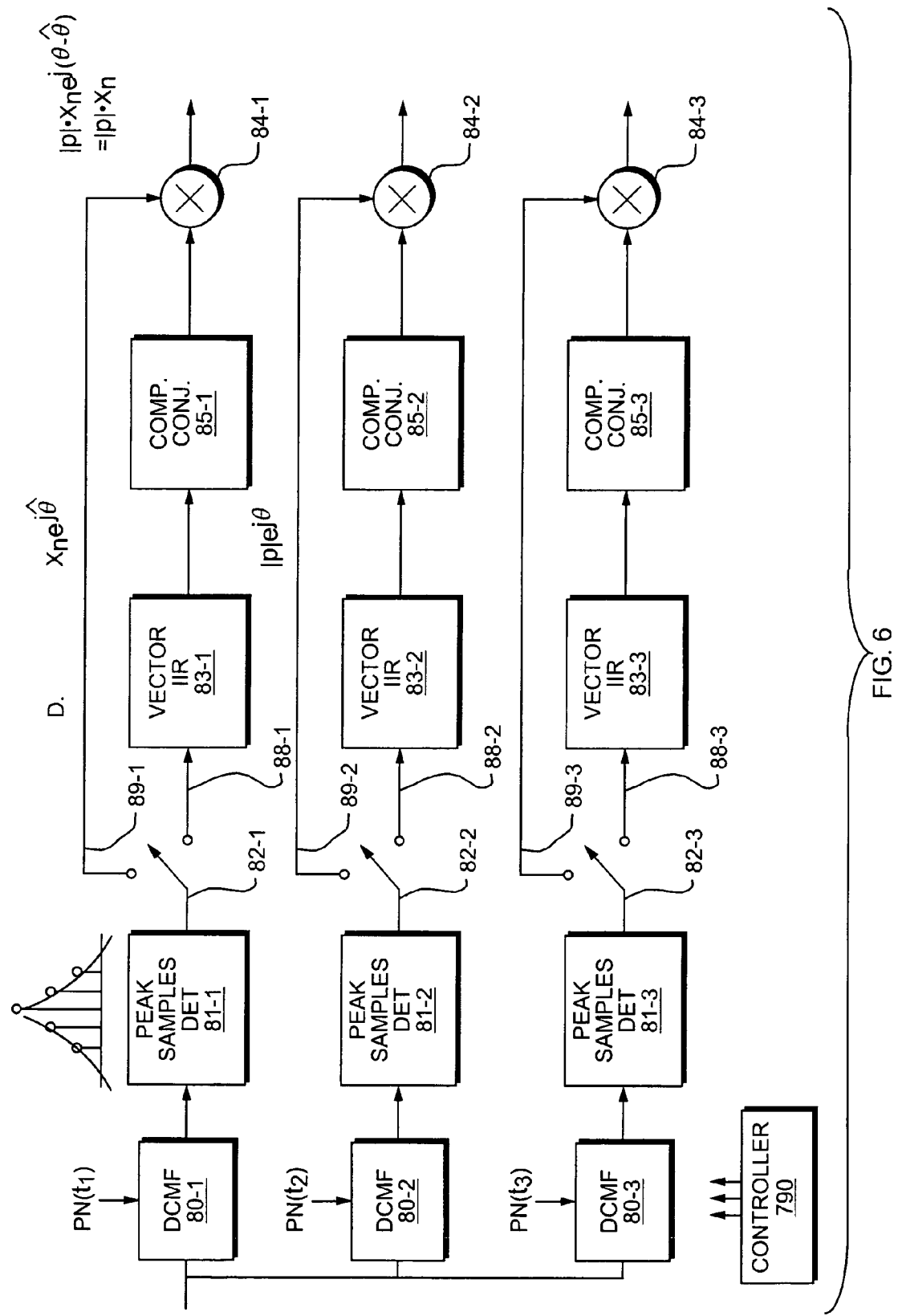

ACCESS CHANNEL STRUCTURE FOR WIRELESS COMMUNICATION SYSTEM

RELATED APPLICATION

This application is a continuation of U.S. application Ser. No. 09/766,875, filed Jan. 19, 2001, now U.S. Pat. No. 6,904,079 which claims the benefit of U.S. Provisional Application No. 60/181,071, filed on Feb. 8, 2000. The entire teachings of the above applications are incorporated herein by reference.

BACKGROUND OF THE INVENTION

The present invention relates generally to the field of wireless digital communications and more particularly to a technique for encoding access channel signals.

The increasing use of wireless telephones and personal computers has lead to a corresponding demand for advanced wireless communication services which were once thought only to be meant for use in specialized applications. In particular, wireless voice communication first became widely available at low cost through the cellular telephone network. The same has also become true for distributed computer networks, whereby low cost, high speed access to data networks is now available to the public through Internet Service Providers (ISPs). As a result of the widespread availability of both technologies, the general population now increasingly wishes to be able to access the Internet using portable computers and Personal Digital Assistants (PDAs) over wireless links.

The most recent generation of wireless communication technologies makes use of digital modulation techniques in order to allow multiple users to share access to the available frequency spectrum. These techniques purportedly increase system capacity for a radio channel of a given available radio bandwidth. The technique which has emerged as most popular within the United States is a type of Code Division Multiple Access (CDMA). With CDMA, each transmitted radio signal is first encoded with a pseudorandom (PN) code sequence at the transmitter. Each receiver includes equipment that performs a PN decoding function. The properties of the PN codes are such that signals encoded with different code sequences or even with different code phases can be separated from one another at the receiver. The CDMA codes thus permit signals to be transmitted on the same frequency and at the same time. Because PN codes in and of themselves do not provide perfect separation of the channels, certain systems have added an additional layer of coding, and/or use modified PN codes. These additional codes, referred to as orthogonal codes, and/or modified PN codes encode the user signals so that they are mathematically exclusive in order to further reduce interference between channels.

In order for the CDMA code properties to hold true at the receiver, certain other design considerations must be taken into account. One such consideration involves the signals traveling in a reverse link direction, that is, from a field unit back to the central base station. In particular, the orthogonal properties of the codes are mathematically optimized for a situation where individual signals arrive at the receiver with approximately the same power level. If they do not, interference between the individual signals which arrive at the base station increases. Precise control over the level of each signal transmitted on the reverse link is thus critical.

More particularly, most CDMA systems are structured such that the forward link channels, that is, the channels carrying information from the base station towards the field unit, are different from the reverse channels. The forward link typically consists of three types of logical channels known as the pilot, paging, and traffic channels. The pilot channel provides the field unit with timing and phase reference information. Specifically, the pilot channel contains a sequence of data bits that permits the field unit to synchronize its PN decoding function with the PN coding used in the base station. The pilot channel is, therefore, typically transmitted continuously by the base station to facilitate the field units demodulation of the other forward link channels.

The paging channel is used to inform the field unit of additional information needed to communicate. Such information is typically management information which informs the field unit of which traffic channels it may use, for example. Other types of paging messages are used to communicate system parameters, access parameters, neighbor lists and other information needed for the field unit to manage its communication in such a way that it does not interfere with other field units transmissions.

The forward traffic channels are used to transmit user data and/or voice signaling information from the base station to the field unit.

On the reverse link, there are typically at least two types of logical channels, including an access channel and traffic channels. The access channel is used by the field unit to send a message to request access to traffic channels when it has data to communicate to the base station. The field unit thus uses the access channel to make requests for connection originations and to respond to paging messages. The traffic channels on the reverse link serve the same purpose as the traffic channels on the forward link, namely, to transmit user data and/or digitized voice payload information.

Pilot channels are not typically used on the reverse link. There are perhaps several reasons for this. For example, the most widely deployed CDMA systems, such as the IS-95 compatible system as specified by the Telecommunications Industry Association (TIA), use asynchronous reverse link traffic channels. It is typically thought that the overhead associated with allowing each field unit to transmit on its own dedicated pilot channel is not necessary. It is also thought that the overhead associated with decoding and detecting a large number of pilot channels back at the base station would not justify any perceived increase in performance.

SUMMARY OF THE INVENTION

In general, pilot signals are advantageous since they provide for synchronous communication. If the communications on the reverse link traffic channels can be synchronized among various field units, parameters can be better optimized for each link individually. It would therefore be advantageous to make pilot signals available for use on the reverse link.

Furthermore, the use of pilot channels on the reverse link would assist in combating effects due to multipath fading. Especially in urban environments where many tall buildings and other surfaces may reflect radio signals, it is common for not just one version of each transmitted signal to arrive at a receiver. Rather, different versions of a particular transmitted signal, each associated with a particular delay, may be actually received. Having additional synchronization timing information available at the base station can help properly decode reverse link signals which have experienced a multipath fade.

The present invention is a technique for efficient implementation of pilot signals on a reverse link in a wireless communication system encompassing a base station which services a large number of field units. According to one aspect of the invention, an access channel is defined for the reverse link such that within each frame or epoch, a preamble portion of the frame is dedicated to sending only pilot symbols. Another portion of each access channel frame, called the payload portion, is then reserved for sending data symbols. In this payload portion of the frame, additional pilot symbols are interleaved among the data symbols.

In the preferred embodiment, the pilot symbols are inserted at predictable, regular intervals among the data symbols.

The preamble portion of the access channel frame allows for efficient acquisition of the access signal at the base station, and provides a timing reference for separating the data and pilot symbols in the payload portion, as well as a timing reference for, optionally, dealing with the effects of multipath fading. This is accomplished by feeding the preamble portion to a pilot correlation filter. The pilot correlation filter provides a phase estimate from the pilot symbols in the preamble portion, which is then used to decode the data symbols in the payload portion.

An access acquisition portion of the receiver then uses these phase estimates provided by the pilot correlation filter to process the output of a data symbol correlation filter.

The additional pilot symbols embedded in the payload portion are preferably used in a cross product modulator to further undo the effects of multipath fading.

The preamble portion of the frame may be defined by Barker sequences, which further assist with properly aligning the timing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a more detailed view of a data detection portion of the coherent demodulator.

DETAILED DESCRIPTION OF A PREFERRED EMBODIMENT

Figure 1:
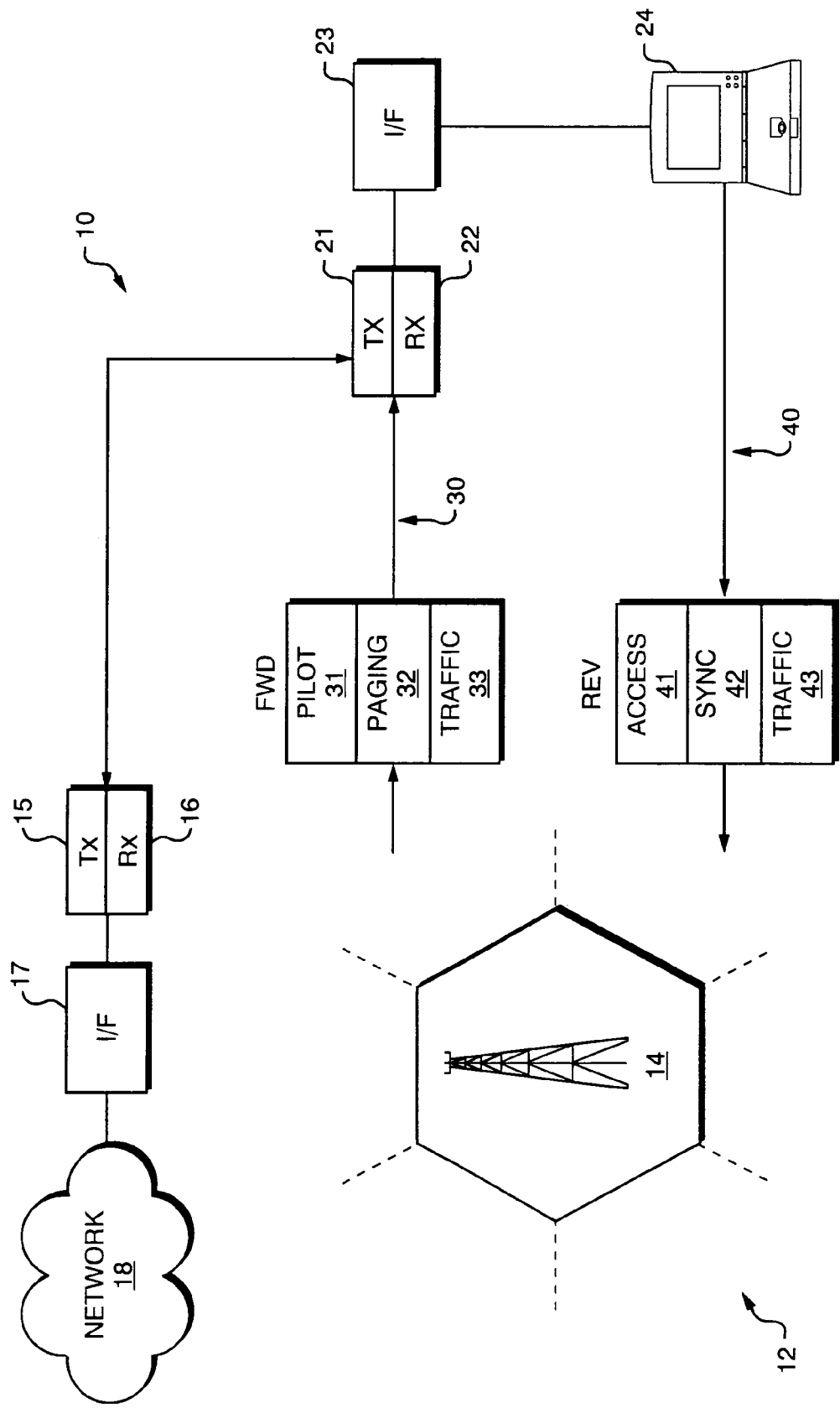
FIG. 1 is a block diagram of the system which uses embedded pilot symbol assisted coherent demodulation according to the invention.

Turning attention to the drawings, FIG. 1 is a generalized diagram showing a wireless data communication system 10 that makes use of an access channel having embedded pilot symbols in order to effectuate coherent demodulation. The system 10 consists of a base station 12 and a field unit 20. The base station 12 is typically associated with a predetermined geographic region 14 in which wireless communication service is to be provided.

The base station 12 contains several components, including a radio transmitter 15, receiver 16, and interface 17. The interface 17 provides a data gateway between the base station 12 and a data network 18 such as the Internet, a private network, a telephone network, or other data network.

The field unit 20 consists of a corresponding receiver 21, transmitter 22, and interface 23. The interface 23 permits the field unit 20 to provide data signals to and receive data signals from computing equipment 24 such as a laptop computer, Personal Digital Assistant (PDA), or other computing equipment. The interface 23 may be a PCMCIA bus, USB port, or other standard computer interface.

The base station 12 communicates with the field unit 20 by exchanging radio signals over various radio channels. The present invention is of particular advantage in a system 10 which uses Code Division Multiple Access (CDMA) modulation to define the channels. In the specific embodiment discussed herein, it is therefore understood that a specific pseudorandom (PN) code (which may or may not be augmented with orthogonal codes) is used to define each of the various logical channels on a given radio carrier frequency.

The forward link 30 consists of various types of logical channels, including at least a pilot channel 31, a paging channel 32, and one or more traffic channels 33. The forward link 30 is responsible for forwarding data signals from the base station 12 towards the field unit 20.

The pilot channel 31 contains typically no baseband information, but rather a stream of bits that are used to permit the field unit 20 to synchronize to the signals sent in the other forward link logical channels such as the paging channel 32 and traffic channel 33.

The paging channel 32 is used to transmit messages from the base station 12 to the field unit 20 that control various aspects of communication, but most importantly, control assignment of various traffic channels 33 for use by each field unit 20.

The forward traffic channels 33 are used to transmit data voice or other signaling messages from the base 12 towards the field unit 20.

Signals are also carried from the field unit 20 towards the base station 12 over a reverse link 40. The reverse link 40 contains several logical channel types including at least an access channel 41, a synchronization (sync) channel 42, and one or more traffic channels 43.

For the reverse link 40, the access channel 41 is used by the field unit to communication with the base station 12 during periods of time when the field unit 20 does not have a traffic channel 43 already assigned. For example, the field unit 20 typically uses the access channel 41 to originate request for calls as well as to respond to messages sent to it on the paging channel 32.

The sync channel 42 on the reverse link may assist in or with the traffic channels 43 to permit the field unit 20 to efficiently send data to the base 12 using synchronous modulation techniques.

The present invention relates to the formatting and use of the reverse link access channel 41. Specifically, the invention uses an access channel 41 that contains within it certain formatting such as certain symbols used to convey pilot signal information.

Figure 2:
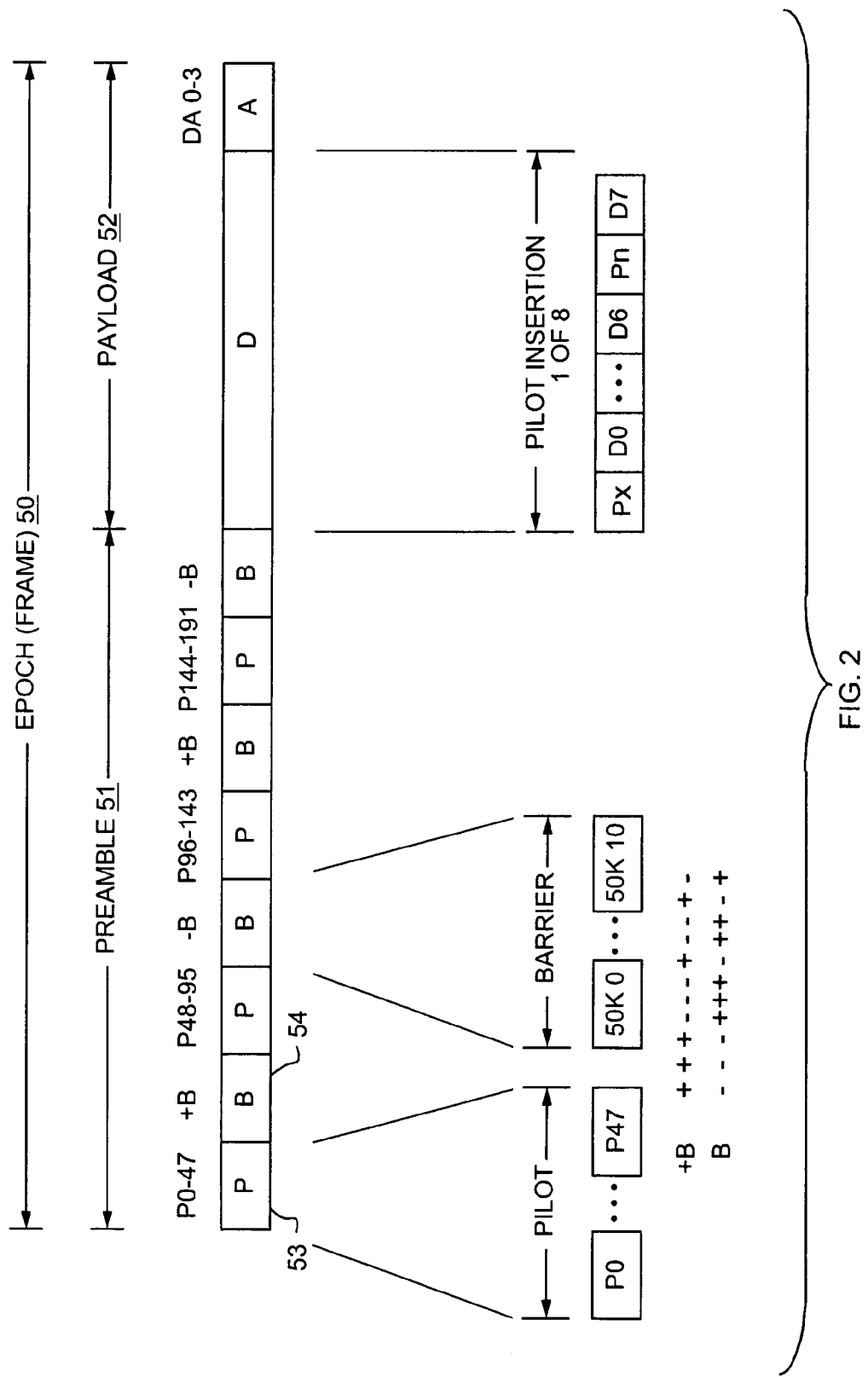
FIG. 2 is a detailed view of the format of data framing used on the access channel.

The access channel 41 signal format is shown in more detail in FIG. 2. An epoch or frame 50 consists of a preamble portion 51 and payload portion 52. The preamble 51 is further defined as a series of symbols including a pilot block 53 and Barker code block 54. Multiple pilot blocks 53 and Barker code blocks 54 make up the preamble 51; in the illustrated preferred embodiment, a pilot block 53 and Barker block 54 are repeated four times in each frame 50. The Barker blocks 54 assist in allowing the receiver to determine where the start of a frame 50 is.

Each pilot block 53 consists of a number of repeated pilot symbols. In the preferred embodiment, 48 pilot symbols are repeated in each pilot block 53. The pilot blocks 53 are used to assist with timing reception and decoding of the information symbols which make up the access channel 41.

The second portion of each frame 50 is the payload portion 52. The payload portion 52 includes a data portion consisting of the information to be sent from the field unit 20 to the base 12. As shown in FIG. 2, pilot symbols 53 are inserted in the data portion of the payload 52. A pilot symbol, for example, may be inserted every eight payload symbols. As will be discussed in greater detail later, these pilot symbols embedded in the payload portion 52 further assist with the coherent demodulation process of the information contained in the data portion.

The pilot symbols 53 typically consist of a series of positive data bits only. Therefore, they do not in and of themselves contain timing information.

The Barker blocks 54 may consist of predetermined patterns of bits, as shown in FIG. 2. Binary Phase Shift Keyed (BPSK) bit encoding may be used to indicate a Barker sequence consisting of three positive bits followed by three negative bits, followed by a single positive bit, a pair of negative bits, a positive bit, and then a negative bit. The positive logic Barker sequence +B may be alternately sent with the negative of the Barker sequence −B to further assist in aligning the beginning of each frame 50 at the receiver 16.

The use of multiple pilot blocks 53 and Barker blocks 54 permit an averaging process to be performed in the acquisition of each access channel 41 is described further below.

Figure 3:
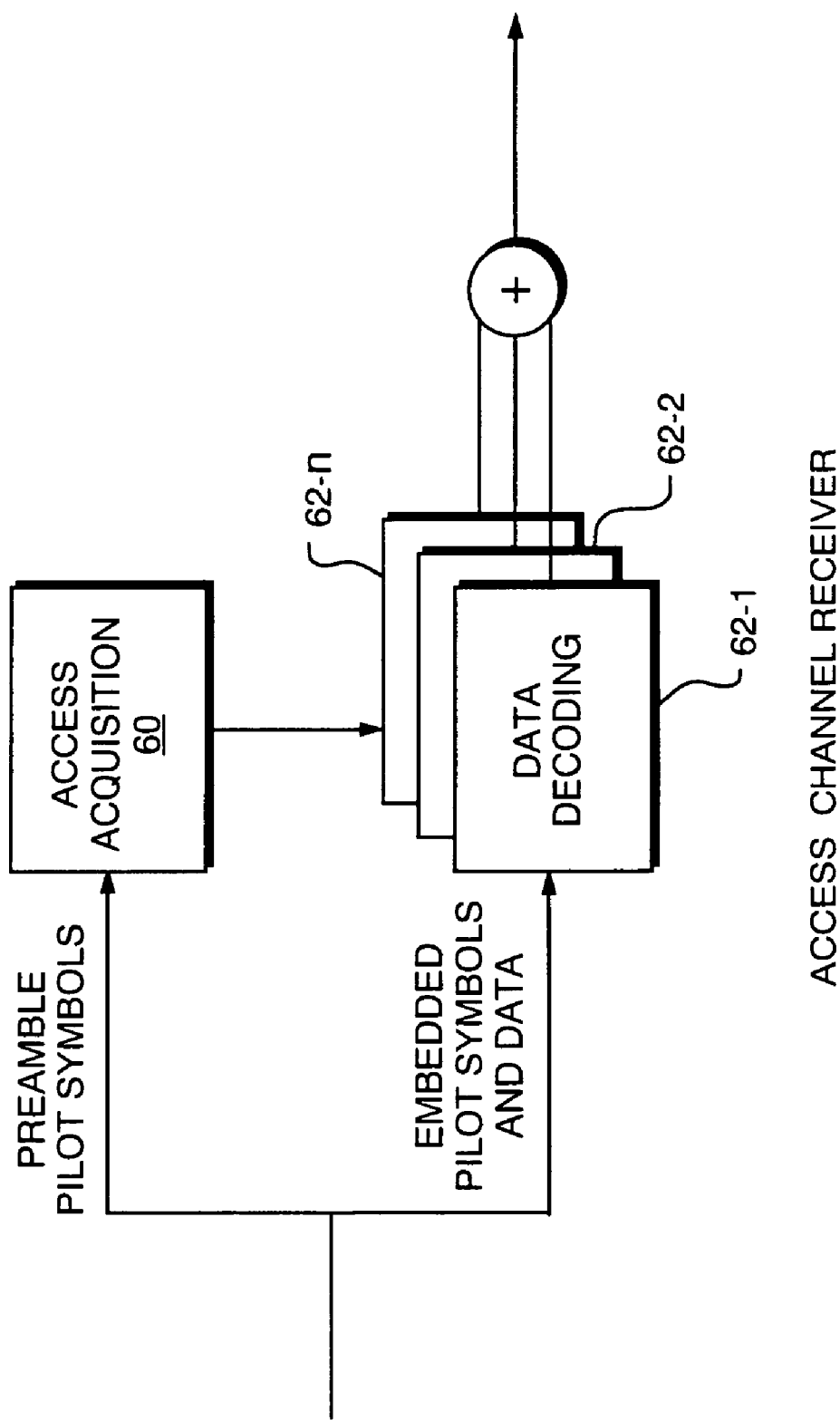
FIG. 3 is a high level diagram of the pilot symbol assisted demodulation process.

FIG. 3 is a generalized block diagram of the portion of the receiver 16 used by the base station 12 to demodulate the reverse link access channel 41. As shown, the access channel receiver consists of two functions including access acquisition 60 and data decoding 62. In a preferred embodiment, multiple data decoding blocks 62-1, 62-2, 62-3 may be used as individual rake receiver portions, or receiver "fingers," tuned to different timing delays.

In general, the preamble pilot symbols are first processed by the access acquisition function 60. These provide generalized timing information which is then fed to the data decoding function 62, along with the payload portion 53 containing the data symbols and embedded pilot symbols. Each of the individual fingers 62-1, 62-2, 62-N make use of the timing information provided by the access acquisition function 60 to properly decode the data in the access channel.

Figure 4:
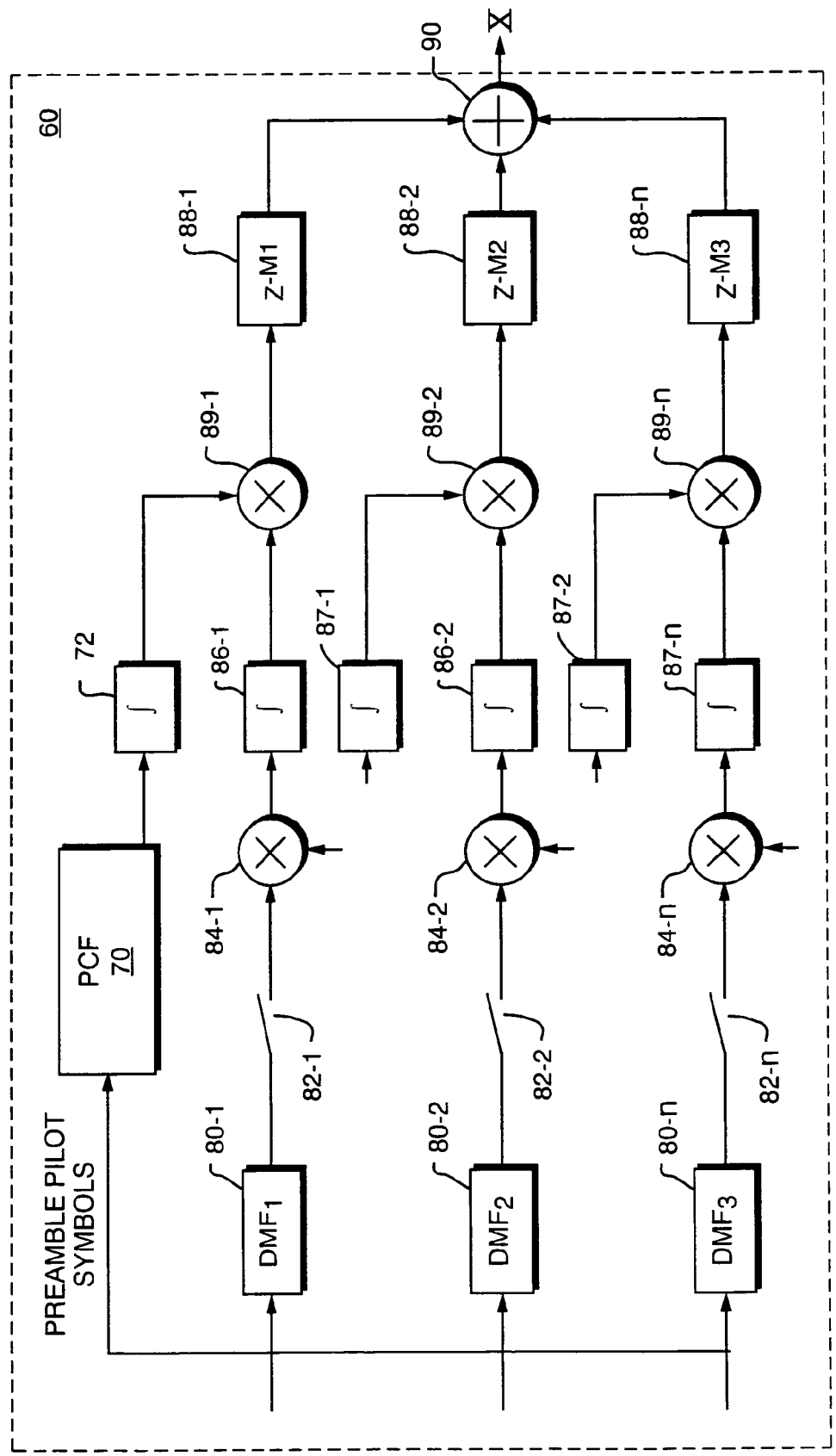
FIG. 4 is a more detailed view of the pilot symbol assisted coherent demodulators.

This receiver signal processing can now be understood more readily by reference to FIG. 4, which is a more detailed diagram of both the access acquisition function 60 and data decoding function 62. In particular, the access acquisition function 60 is seen to include a Pilot Correlation Filter (PCF) 70 as well as an integration function 72. As will be discussed in more detail below, the PCF 70 is a matched digital filter having coefficients matched to provide an impulse response to input preamble pilot signals.

The integration function 72 operates on successive outputs of the pilot correlation filter 70 to provide a smoothed estimate of timing information inherent in the pilot symbols.

The data decoding portions 62 each include a data matched filter 80, a selection function 82, a dot or "cross" product function 84, integration functions 86, and delay 88. A summer 90 operates on the outputs of the individual data decoders 62-1, 62-2, . . . , 62-$n$ to provide an estimate of the payload data. Briefly, each of the data decoders 62 operates as a synchronous demodulator to provide an estimate of the data symbols for a given respective possible multipath delay. Although three data decoders 62 are shown in FIG. 4, it should be understood that a smaller number of them may be used depending upon the anticipated number of multipath delays in the system 10.

Figure 5:
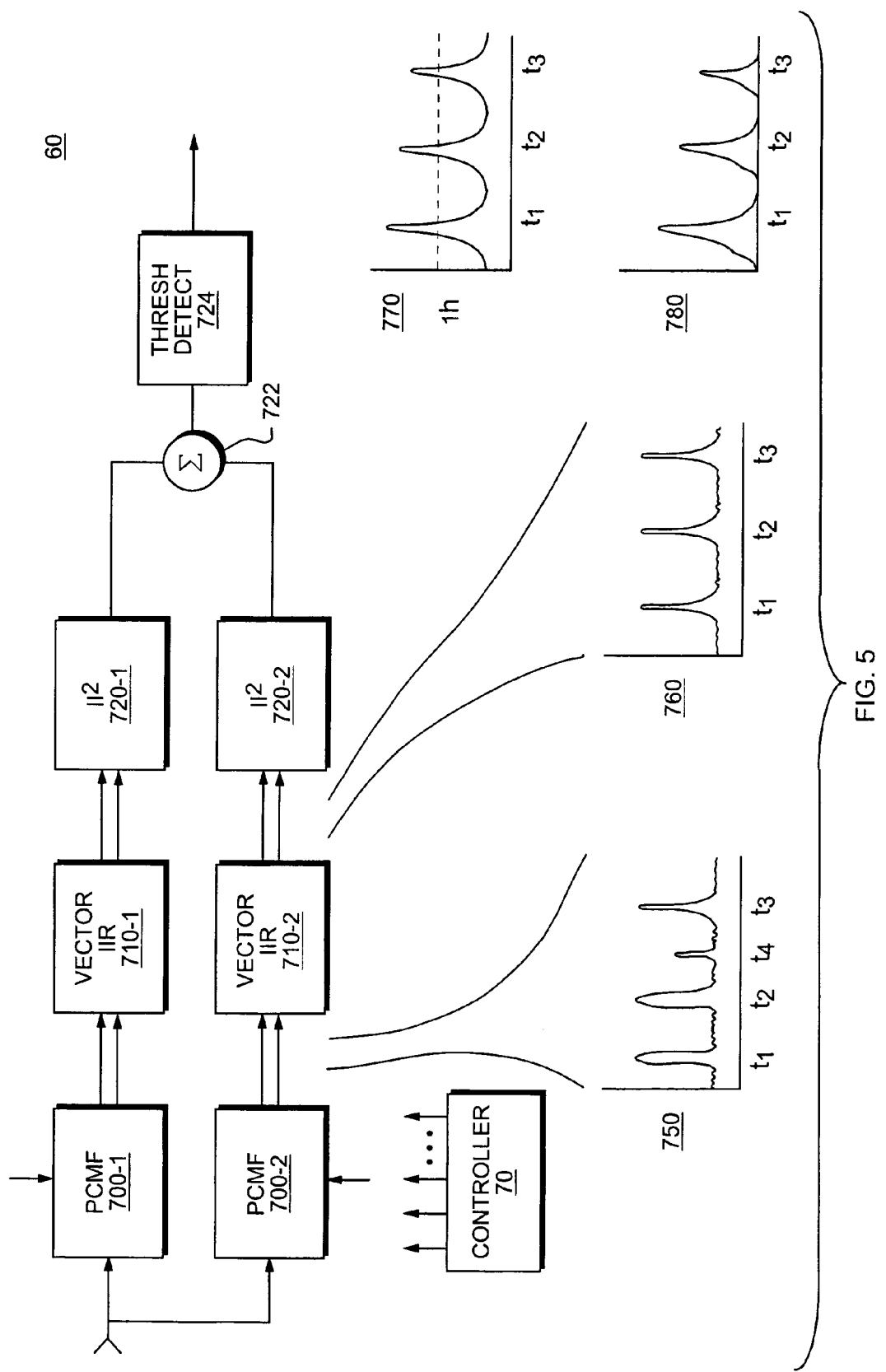
FIG. 5 is a still more detailed view of an access acquisition portion of the coherent demodulator.
Figure 1:
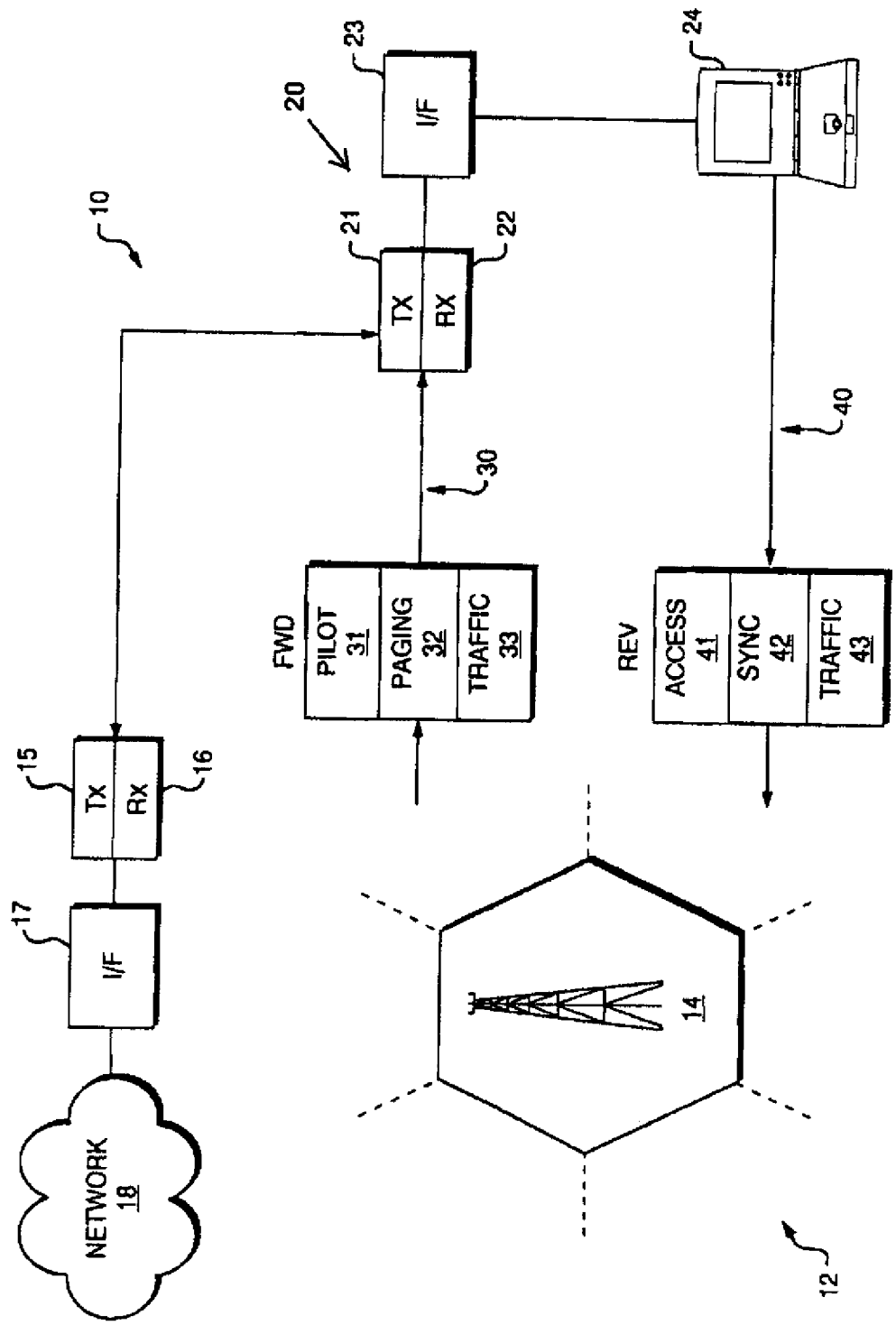

FIG. 5 is a more detailed block diagram of the access acquisition portion 60. This circuit includes the previously mentioned pilot correlation filter 70 in the form of a pair of pilot correlation matched filters (PCMFs) 700-1, 700-2, and a corresponding pair of vector infinite impulse response (IIR) filters 710-1 and 710-2. In addition, the integration function 72 is provided by the pair of magnitude squaring circuits 720-1 and 720-2, a summer 722, and threshold detector 724.

In operation, the access channel 41 signal is fed to the pilot correlation matched filter (PCMF) sections 700-1 and 700-2. The pair of PCMFs 700 are used in a ping pong arrangement so that one of the PCMFs may be operating on received data while the other PCMF is having its coefficients loaded. In the preferred embodiment, the access channel is encoded using 32 PN code chips per transmitted symbol. At the receiver, 8 samples are taken per chip (e.g., 8 times the chip rate of 1.2288 megahertz (MHz)). The pilot correlation matched filter 700 must not only be matched to receive the pilot symbols, but also to the particular pseudorandom noise (PN) code used for encoding the access channel. A controller 730 is used to control the operation of the two portions of the access acquisition circuit 60, both the top half and bottom half, as illustrated.

Continuing with the discussion of the Pilot Correlation Filter 70, the vector IIR filter 710-1 receives the output of the PCMF 700-1 in the form of in-phase (I) and quadrature (Q) samples. As shown in the signal diagram 750 next to the output of the PCMFs 700, the output tends to be a series of peaks spaced apart in time, with the peak spacing, depending upon the multipath delays experienced on the reverse link. For example, a peak occurring at a first time T1 may be associated with the most direct signal path taken. A second peak may occur at a time T2 associated with a portion of the signal which follows an alternate path. Finally, a third peak may be associated with a time T3 which follows yet a different path from the field unit 20 to the base 12. The series of peaks are output for each of the 48 symbols in the pilot burst. The function of the vector IIR filter 710-1 is thus to average these pilot bursts to provide a more well defined set of peaks 760 which represents the outputs of the PCMF 700-1 averaged over time. The averaging process implemented by the vector IIR filter 710-1 may, for example, eliminate a false peak, such as that occurring at time T4, which is attributable to a noise burst and not to an actual multipath signal portion.

The output 760 of the vector IIR filter 710 thus represents an estimate of where the true multipath peaks occur in the reverse link access channel 41.

Of ultimate interest is the signal level of the received pilot signal. To determine this level, the magnitude block 720-1 takes the magnitude of the vector IIR output signal 760. The sum circuit 722 thus sums these signals as provided by each of the two ping pong branches 700. A threshold detector 724 is then applied to the summed signal to provide an output similar to the plot 770. The threshold detector is set at a predetermined amplitude TH so that an output appears as in plot 780.

The points at which the summed signal output crosses the threshold TH indicate points at which rake fingers 62 will be assigned to processes the signal. In particular, the peaks occurring at times T1, T2 and T3 are examined, and each respective time is used and assigned to a respective data matched filter 80 and the corresponding finger 62. These provide an estimate of possible phases from the pilot symbols which is in turn used in the data decoding process.

FIG. 6 illustrates how the data detection process of the three rake fingers 62. Each finger 62 is identical. An exemplary rake finger 62-1 consists of a corresponding Data Correlation Matched Filter (DCMF) 80-1, a peak sample detector 81-1, a switch 82-1, a vector IIR filter 83-1, complex conjugate function 85-1, and dot product circuit 84-1.

In operation, the access channel signal is first fed to the Data Correlation Matched Filter (DCMF) 80-1. This filter 80-1 is loaded with coefficients at a specific phase delay of the PN sequence. In this instance, the phase delay loaded is that data associated with the time T1 indicated from the output of the access acquisition block 60.

The output of data correlation matched filter 80-1 will consist of a signal having a localized peak. As shown in the diagram next to the peak sample detector 81-1, the peak sample detector 81-1 selects a predetermined number of samples around this peak for further processing.

These peak values are then fed to the switch 82-1. The switch 82-1, under the operation of the data decoder controller 790, alternately steers the peak detected signal, depending upon whether it contains pilot symbols or pilot plus data symbols. The decoder controller 790 may be synchronized with a start of frame indication as determined by the received Barter symbols in the preamble portion, and therefore knows the position of pilot symbols in the payload portion. Thus, while receiving the payload or data portion 52 of the access channel frame 50, the signal will be steered to the lower leg 88-1, in the case of receiving a pilot symbol, or in the case of receiving a data symbol, will be steered to the upper leg 89-1.

The pilot symbols of the payload portion 52 are processed in a manner similar to the pilot symbol processing in the preamble portion 51. That is, they are processed by a vector IIR filter 83-1 to provide an averaged estimate of an estimate signal value $[p]e^{j}$. The complex conjugate of this pilot estimate is then determined by the complex conjugate circuit 85-1.

Data symbols steered to the upper leg 89-1 provide a data estimate signal $x_n e^{je}$.

The two estimate signals, data and pilot are then fed to the multiplier 84-1 to provide a cross product of the pilot symbols with the data symbols. This causes the phase terms of the complex signal to cancel more or less. That is, the phase estimate (theta) should be approximately equal to the measured phase theta of the pilot symbols. The output thus represents the pilot channel energy $|p|^{-}x_n$. Given a pilot symbol normalized value of 1, the data is therefore recovered.

Returning to FIG. 4, the reader will recall that this is the output of only one rake finger 62-1. Each rake finger output is, therefore, then fed through the integrators 86, 87, additional dot product circuits 89, and delays 88-1, to the summer 90 to provide a final estimate of the data, X.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for coherent demodulation of received data in a wireless communication system, the method comprising:

receiving an access channel packet, the access channel packet including a preamble portion and a payload portion, the preamble portion comprising a plurality of first pilot symbols and the payload portion comprising at least one data symbol and at least one second pilot symbol interleaved with the at least one data symbol;

oversampling the access channel packet to generate samples;

processing the samples to obtain a pilot symbol phase estimate based on the pilot symbols in the preamble portion; and decoding the at least one data symbol based on the second pilot symbol, wherein the pilot symbol phase estimate is used to synchronize decoding of the at least one data symbol.

2. The method of claim 1 wherein the preamble portion further includes a predetermined code sequence interleaved with the first pilot symbols.

3. The method of claim 2 wherein the predetermined code sequence is a Barker code sequence.

4. The method of claim 1 wherein the second pilot symbol is interleaved with the data symbol with a regular interval.

5. The method of claim 4 wherein the second pilot symbol is interleaved with every eight (8) data symbols.

6. A base station for receiving data in a wireless communication system, the base station comprising:

a receiver configured to receive a signal including a preamble and a payload, wherein the preamble includes a first pilot symbol, and the payload includes a second pilot symbol and data;

a sampler configured to sample the received signal and generate samples;

a phase estimator configured to estimate a phase estimate of the signal based on the first pilot; and a decoder configured to decode the data symbols contained in the payload based on phase estimate.

7. The base station of claim 6, wherein the signal is received from a field unit associated with the base station.

8. The base station of claim 6, wherein the signal is an access request message received from a field unit.

9. The base station of claim 6, wherein the first pilot symbol includes a plurality of first pilot symbols.

10. The base station of claim 6, wherein the payload includes a plurality of second pilot symbols interleaved with the data.

11. A field unit for transmitting data in a wireless communication system, the field unit comprising:

a transmitter configured to transmit a signal including a preamble and a payload, wherein the preamble includes a first pilot symbol, and the payload includes a second pilot symbol and data;

wherein the signal can be decoded based on a phase estimate based on the first pilot symbol.

12. The field unit of claim 11, wherein the signal is an access request message sent to a base station.

13. The field unit of claim 11, wherein the first pilot symbol includes a plurality of first pilot symbols.

14. The field unit of claim 11, wherein the payload includes a plurality of second pilot symbols interleaved with the data.

* * * * *

UNITED STATES PATENT AND TRADEMARK OFFICE
CERTIFICATE OF CORRECTION

| | | |
|---|---|---|
| PATENT NO. | : 7,483,473 B2 | Page 1 of 3 |
| APPLICATION NO. | : 11/103202 | |
| DATED | : January 27, 2009 | |
| INVENTOR(S) | : Hoffman et al. | |

It is certified that error appears in the above-identified patent and that said Letters Patent is hereby corrected as shown below:

ON THE TITLE PAGE

In the illustrative figure, delete the word "BARRIER" and insert therefor --BARKER--.

IN THE DRAWINGS

Delete sheet 1, and replace with sheet 1. (Attached)

In Fig. 2, Sheet 2 of 6, delete the word "BARRIER" and insert therefor --BARKER--.

IN THE SPECIFICATION

At column 1, line 18, after "computers has", delete "lead" and insert therefor --led--.

At column 4, line 28, after the word "traffic", delete "channel" and insert therefor --channels--.

At column 4, line 35, after the word "base", insert --station--.

At column 4, line 43, after the word "unit", insert --20--.

At column 4, line 51, after the word "base", insert --station--.

At column 4, line 64, after the word "Barker", insert --code--.

At column 4, line 65, after the word "Barker", insert --code--.

At column 5, line 9, at the beginning of the line, insert --station--.

At column 5, line 10, after the word "payload", insert --portion--.

At column 5, line 19, after the word "Barker", insert --code--.

Signed and Sealed this
Twenty-eighth Day of July, 2015

Michelle K. Lee
*Director of the United States Patent and Trademark Office*

CERTIFICATE OF CORRECTION (continued)
U.S. Pat. No. 7,483,473 B2

IN THE SPECIFICATION (continued)

At column 5, line 28, after the word "Barker", insert --code--.

At column 5, lines 34-35, after the word "acquisition", insert --function--.

At column 5, line 36, after the word "62-2,", delete "62-3" and insert therefor --62-n--.

At column 5, line 42, after the word "portion", delete "53".

At column 5, line 44, after the word "62-2,", delete "62-N" and insert therefor --62-n--.

At column 6, line 5, after the word "acquisition", delete "portion" and insert therefor --function--.

At column 6, line 23, after the word "controller", delete "730".

At column 6, lines 24-25, after the word "acquisition", delete "circuit" and insert therefor --function--.

At column 6, line 39, after the word "base", insert --station--.

At column 7, line 12, after the word "acquisition", delete "block" and insert therefor --function--.

At column 7, line 33, after "provide an", delete "averaged" and insert therefor --average--.

At column 7, line 35, after the word "conjugate", delete "circuit" and insert therefor --function--.